J. W. BOPE.
Harvester.
No. 45,906.
Patented Jan. 17, 1865.
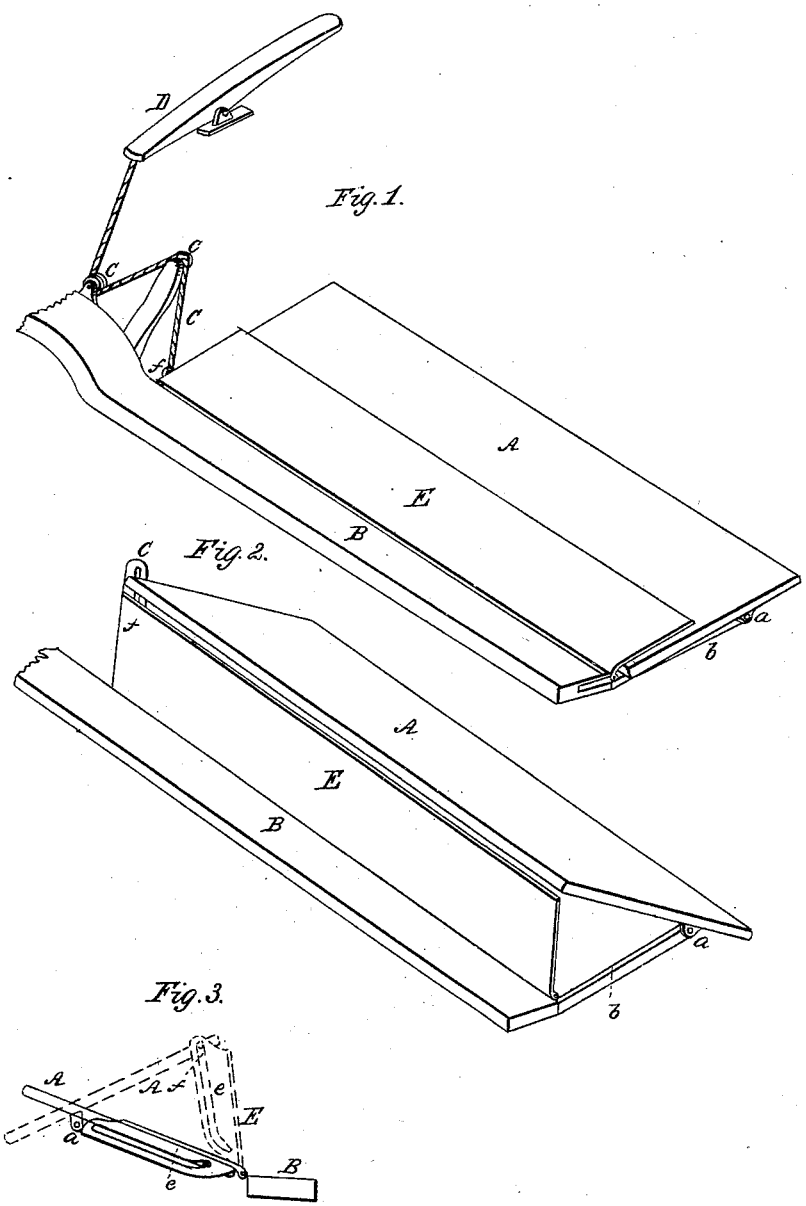
Witnesses:
Inventor:

UNITED STATES PATENT OFFICE.

JACOB W. BOPE, OF ST. LOUIS, MISSOURI.

IMPROVEMENT IN HARVESTERS.

Specification forming part of Letters Patent No. 45,906, dated January 17, 1865.

*To all whom it may concern:*

Be it known that I, JACOB W. BOPE, of the city and county of St. Louis, in the State of Missouri, have invented a new and useful Method or Device for Dropping Grain; and the following is a full, clear, and exact description of the same, reference being had to the accompanying drawings, making a part of this specification, in which—

Figure 1 represents a perspective view of a finger-bar and dropping device with the fixtures for operating the same in position to receive the cut grain. Fig. 2 shows a view of the same, the dropper being tilted to let off the gavel, at the same time placing the shield or guard in a position to prevent any substance from getting between the finger-bar and the dropper. Fig. 3 shows an end view of the dropping-platform and shield in two positions.

My invention consists in hinging a dropping-platform at a fixed point at or near its center, for the purpose and in the manner hereinafter explained, and in the means for operating or tilting the same; also, in the arrangement of an adjustable shield or guard to close up the space and prevent the grass or other substance from getting in between the finger-bar and the tilting platform or table.

To enable others skilled in the art to make, apply, and use my invention, I will describe it in detail, referring to the drawings and to the letters marked thereon.

I make my table or platform A, on which the cut grain is lodged, of smooth plank; or it may be a light strong frame, the top surface or plane being covered. On the under side, a little back of its center, are staples or hinges *a a*, connecting with the arms *b b*, which connect the tilting platform to and support it in the rear of the finger-bar B, the hinges *a a* being enough in the rear of the center of the platform A to make the preponderence of its weight forward, so that it will fall back to its position and rest on the arms *b b* at all times when it is not tilted by the action of the chain or cord C, passing over pulleys *c c*, connecting with the foot-lever D, by which the driver, at will, operates it to drop the grain in gavels.

To the rear edge of the finger-bar B, I hinge my shield or guard E, which may be made of sheet metal, and fold over the forward edge of the platform A, so that it will lay flat upon it, as seen in Fig. 1, when the platform is in the proper position to receive the grain.

On the machine end of the guard E is a slitted bar, *e*, into which a pin, *f*, slides, the pin *f* being attached to the platform A, so that when the platform is tilted to drop the gavel the pin *f* will lift the guard or shield E, so as to close the opening between the finger-bar and the platform, and thus effectually prevent grass or other extraneous matter from getting in between to choke up and prevent the platform from assuming its proper place.

Having thus described my invention, what I claim as new, and desire to secure by Letters Patent, is—

1. Hinging the grain-platform, which is arranged directly behind the cutting apparatus, at or near its center, substantially as described, so that it will vibrate upon a fixed point, and, by the elevation of its front edge, perform the double function of discharging the completed gavel, and simultaneously therewith arresting upon its front edge the fall of the accumulating grain, as described.

2. Operating the tilting platform A by means of the lever D and the chain or cord C, in the manner as and for the purposes herein described.

3. The adjustable shield or guard E, arranged and operating in connection with the grain-platform as herein described, for the purposes set forth.

J. W. BOPE.

Witnesses:
J. M. CONNEL,
J. B. WOODRUFF.